(12) United States Patent
Khadkikar et al.

(10) Patent No.: US 7,775,105 B2
(45) Date of Patent: Aug. 17, 2010

(54) MULTI-FUNCTION SENSOR

(75) Inventors: Prasad Khadkikar, West Chester, OH (US); Bernd D. Zimmermann, Ashland, OH (US)

(73) Assignee: Therm-O-Disc, Incorporated, Mansfield, OH (US)

( * ) Notice: Subject to any disclaimer, the term of this patent is extended or adjusted under 35 U.S.C. 154(b) by 696 days.

(21) Appl. No.: 11/587,325

(22) PCT Filed: Apr. 21, 2005

(86) PCT No.: PCT/US2005/013662
§ 371 (c)(1),
(2), (4) Date: Jul. 12, 2007

(87) PCT Pub. No.: WO2005/106403
PCT Pub. Date: Nov. 10, 2005

(65) Prior Publication Data
US 2008/0107151 A1 May 8, 2008

Related U.S. Application Data

(60) Provisional application No. 60/564,129, filed on Apr. 21, 2004.

(51) Int. Cl.
*G01F 23/00* (2006.01)
(52) U.S. Cl. ...................... 73/290 R; 73/655
(58) Field of Classification Search ............... 73/290 R, 73/655
See application file for complete search history.

(56) References Cited

U.S. PATENT DOCUMENTS

| | | | |
|---|---|---|---|
| 4,471,661 A | 9/1984 | Edwards, Jr. | |
| 4,785,665 A | 11/1988 | McCulloch | |
| 5,831,159 A | 11/1998 | Renger | |
| 6,134,952 A | 10/2000 | Garver et al. | |
| 6,595,049 B1 | 7/2003 | Maginnis, Jr. et al. | |
| 7,146,991 B2 * | 12/2006 | Stockert | 134/57 R |
| 7,534,304 B2 * | 5/2009 | Conrad et al. | 134/10 |
| 2002/0032532 A1 | 3/2002 | Babel et al. | |
| 2003/0117623 A1 | 6/2003 | Tokhtuev et al. | |
| 2004/0117919 A1 * | 6/2004 | Conrad et al. | 8/137 |
| 2004/0139555 A1 * | 7/2004 | Conrad et al. | 8/137 |
| 2005/0091755 A1 * | 5/2005 | Conrad et al. | 8/137 |
| 2005/0091756 A1 * | 5/2005 | Wright et al. | 8/137 |

* cited by examiner

*Primary Examiner*—Hezron Williams
*Assistant Examiner*—Rodney T Frank
(74) *Attorney, Agent, or Firm*—Harness, Dickey & Pierce, P.L.C.

(57) ABSTRACT

A multi-function sensor is disclosed which provides a reliable and simple device for accurately measuring and/or monitoring the ambient conditions within a container or the like, such as the level of a fluid, the turbidity of a fluid, the temperature of a fluid or surrounding environment and the ambient pressure. The sensor incorporates a fluid level sensor module, a turbidity sensor module, a temperature sensor module and a pressure sensor module. The fluid level sensor module utilizes a plurality of thermocouple junctions grouped in pairs with the pairs being spaced along a line extending generally in the direction in which the liquid level may vary. The thermocouple junctions are connected in series and produce a signal indicative of the level of liquid along the sensor. A turbidity sensor module is also integrally included on the multi-function sensor. Additionally, temperature and pressure sensor modules may also be incorporated in the multi-function sensor. Alternatively, a fluid flow rate sensor module may be included in place of the liquid level sensor module.

22 Claims, 9 Drawing Sheets

MULTI-FUNCTION SENSOR

CROSS-REFERENCE TO RELATED APPLICATIONS

This application claims the benefit of U.S. Provisional Application No. 60/564,129, filed on Apr. 21, 2004. The disclosure of the above application is incorporated herein by reference.

FIELD OF THE INVENTION

The invention relates generally to devices used to measure certain ambient conditions within an environment, such as the level or flow rate of a fluid or within a vessel or container, the turbidity of the fluid, and the temperature or pressure of the fluid and/or the ambient environment.

BACKGROUND OF THE INVENTION

There exists a wide variety of applications in which it is desirable to measure and/or monitor to some degree certain ambient conditions within a container or the like, such as the level of a fluid, the flow rate of a fluid, the turbidity of a fluid, the temperature of a fluid or its surrounding environment and the ambient pressure. Such applications may range from monitoring these conditions in various systems, such as an internal combustion engine or fuel tank, a pump or compressor, or even within a tank or tub, such as for a household appliance like a dishwasher or clothes washer.

In each of these applications it is desirable that the multi-function sensor be capable of providing a reliable, accurate indication of the fluid level, fluid flow rate, turbidity, temperature and/or pressure over an extended period of time without requiring periodic maintenance. In many applications the sensor must be capable of enduring various degrees of vibration, heat or other hostile environmental elements, as well as space limitations. Additionally, in some applications utilizing sealed vessels such as hermetic compressors and household appliances, it is desirable to minimize the number of penetrations through the wall(s) of the vessel in order to reduce the potential for leakage.

Various types of devices have been developed over the years for separately sensing individual conditions such as fluid level, fluid flow rate, fluid turbidity, fluid and/or ambient temperature, and fluid and/or ambient pressure. Such sensor devices, however, have not combined the multiple functionalities into a single sensor device.

SUMMARY OF THE INVENTION

The invention provides an extremely reliable multi-function sensor which is compact and simple in design and can be manufactured at very low costs. Further the sensor of the invention can be encapsulated or coated with a variety of suitable materials to enable it to maintain prolonged operation in numerous different and potentially hostile ambient environments.

The multi-function sensor of the invention incorporates a combination of more than one of a fluid level sensing component or a fluid flow rate sensing component, a turbidity sensing component, a temperature sensing component and a pressure sensing component.

The fluid level sensing component comprises a module having at least one first thermocouple junction(s) arranged along a substrate with a suitable heater arranged in close proximity. In order to compensate for ambient temperature, a second, compensating thermocouple junction is associated with each of the at least one first thermocouple junction(s) and laterally spaced therefrom. The first and second thermocouple junctions are interconnected in series with respective first and second thermocouple junctions alternating in the serial interconnection. The first one(s) of the thermocouple junction(s) provide an indication of a rate of heat dissipation which is directly related to the level of the fluid in which the component is placed, while the second thermocouple junction(s) provide a compensation factor dependent upon the ambient temperature.

The fluid flow rate sensing component comprises a probe having a detection module adapted to change condition in response to the flow of the fluid, and a control module that is electrically connected to the probe that monitors the condition of the detection module over time (e.g., a temperature), determines a rate of change of that condition over time, and generates an output that is indicative of the rate of flow of the fluid.

The turbidity sensing component comprises a module for measuring the state of cleanliness (or conversely "dirtying") of a fluid. A turbidity measurement is often used to indirectly determine the state of cleanliness of a product to be cleaned, such as within a household appliance like a clothes washer or dishwasher. The turbidity sensing component utilizes a light beam propagating through a fluid medium to determine, for example, whether the fluid is clouded by particulate matter suspended in the fluid. The extent to which the light is transmitted, reflected or "scattered" through the medium, correlates and may be calibrated to measure the turbidity of the fluid.

Additionally, temperature and pressure sensing components of the multi-function sensor comprise respective modules having thermocouple junctions for providing signals indicative of these conditions in their ambient environments.

The arrangement of the multi-function sensor of the invention not only provides a very simple and reliable device for obtaining measurements for multiple ambient conditions in an environment, but also further minimizes the number of mounting locations on a container and the corresponding penetrations extending through the container wall. This feature is significant, particularly when the sensor is to be employed within a closed or sealed system.

A hermetic interface is further provided for use together with the multi-function sensor. The hermetic interface enables the sensor to be employed in apparatus having a sealed or closed container into which the multi-function sensor extends through a container wall, such as in a hermetically-sealed compressor or an appliance like a clothes washer or dishwasher. The hermetic interface can include a hermetic or semi-hermetic feedthrough that provides one or more pin connectors or leads for electrically connecting to the sensor. The hermetic interface enables power from outside of the container to be provided to the multi-function sensor inside of the container and output from the sensor inside the container to pass from to the outside of the container, while not compromising the container's seal. The hermetic interface can further include circuitry to regulate the power carried to the multi-function sensor, as well as circuitry for conditioning the sensor's output signal(s).

Also, a protective shield can be provided to surround the sensor. The shield serves as a barrier between the sensor and sloshing fluid disposed within the container.

Additional advantages and features of the invention will become apparent from the subsequent description and the appended claims taken in conjunction with the accompanying drawings.

DESCRIPTION OF THE PREFERRED EMBODIMENTS

Figure 1:
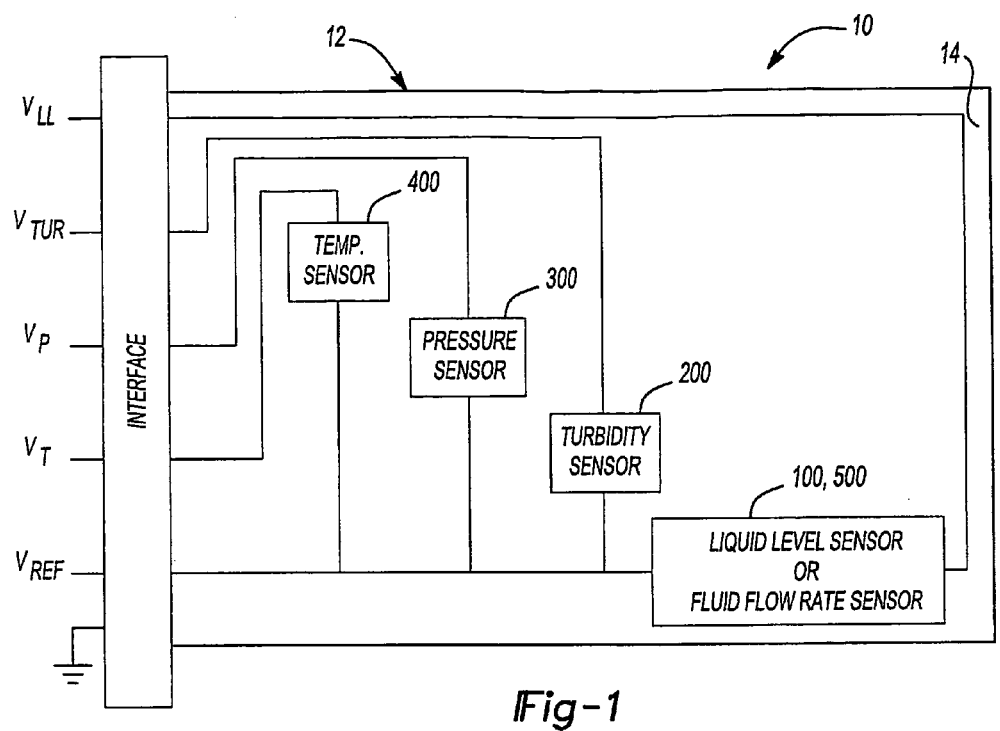
FIG. 1 is schematic block diagram of a multi-function sensor in accordance with the invention.

Referring now to the drawings and in particular to FIG. 1, there is shown a schematic block diagram of a multi-function sensor 10 in accordance with the invention. Multi-function sensor 10 comprises a printed circuit board 12 upon which a plurality of sensor modules 100 or 200, 300, 400, and 500 are supported. The sensor modules 100 or 200, 300, 400, and 500 may include a liquid level sensor module 100, a turbidity sensor module 200, a pressure sensor module 300 and a temperature sensor module 400 Alternatively to the liquid level sensor 100, a fluid flow rate sensor module 500 may be incorporated into the multi-function sensor 10. Although FIG. 1 schematically depicts the several sensor modules 100, 200, 300, 400, 500 in a particular combination, it is understood that any combination of the several sensor modules 100, 200, 300, 400, 500 may be employed to provide a multi-function sensor in accordance with the invention.

The printed circuit board 12 includes a relatively rigid, elongate substrate 14. The substrate 14 may be fabricated from a variety of different materials but will preferably be made from a suitable printed circuit board material having good electrical insulating capabilities and preferably resistant to degradation from the environment in which it will be utilized. It is also preferable that the material be relatively thin to promote heat transfer from one surface to the other so as to promote faster response time in the sensor modules 100, 200, 300, 400, 500.

Preferably, the printed circuit board 12 and sensor modules 100, 200, 300, 400, 500 are coated or encapsulated with a thin, electrically insulating coating. The coating affords protection to the sensor from environmental elements and reduces the possibility of a short circuit. Such coatings must have good heat transfer characteristics but yet must also provide sufficient electrical insulation to the components. Also, the coating must be translucent at the operating wavelength of the light source that is associated with the turbidity sensor module, as described below. Additionally, it is highly desirable that the coating be able to clearly shed the liquid in the environment which the multi-function sensor 10 is to be used so as to minimize the potential for erroneous readings. One such material that is contemplated for this invention is commercially available under the tradename Parylene. One of Dow Corning Corporation's RTV elastomeric conformal coatings may provide another source of suitable coating materials.

The multi-function sensor 10 of the invention can incorporate a liquid level sensor module 100 for sensing the level of a fluid in an environment. The liquid level sensor module 100 is supported on the printed circuit board 12. A suitable liquid level sensor module that may be integrated into the multi-function sensor 10 is shown and described in U.S. Pat. No. 6,546,796, entitled "Liquid Level Sensor," issued Apr. 15, 2003 and owned by Therm-O-Disc, Incorporated, the assignee of the present patent application, the disclosure of which is hereby incorporated by reference.

In particular, at col. 2, line 38 through col. 9, line 30, U.S. Pat. No. 6,546,796 describes a liquid level sensor utilizing a plurality of thermocouple junctions grouped in pairs and connected in series, with the pairs being spaced along a line generally extending in the direction along which the liquid level may vary. A first or "hot" thermocouple junction of each pair of thermocouple junctions is located in relatively close thermal proximity to an electrically powered heater. The second or "cold" thermocouple junction of each pair of thermocouple junctions is relatively laterally offset from the first thermocouple junction and the heater along a line extending parallel to the surface of the liquid to be measured. Any number of pairs of first and second thermocouple junctions may be selected so as to ensure a sufficient number and spacing to cover a desired range of liquid level to be sensed, as well as the degree of resolution desired. An output voltage $V_{LL}$ measured across the thermocouple junctions is indicative of the level of the liquid being sensed.

Figure 2:
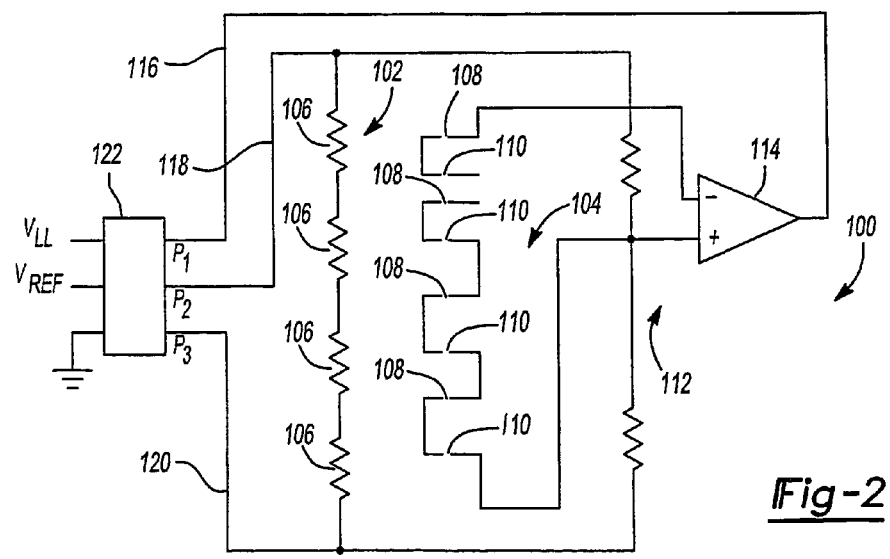
FIG. 2 is a schematic circuit diagram of an exemplary liquid level sensor module of the multi-function sensor of the invention.

FIG. 2 illustrates a schematic circuit diagram for an exemplary liquid level sensor module 100 for the multi-function sensor 10 of the invention. As shown, the liquid level sensor module 100 generally comprises a heater circuit 102 and a thermocouple circuit 104. The heater circuit 102 includes a plurality of discrete heaters 106, such as resistors. The thermocouple circuit 104 comprises a plurality of "hot" 108 and "cold" 110 thermocouple junctions which are connected in series, alternating between hot 108 and cold 110 thermocouple junctions. A voltage divider 112 and an amplifier 114 also form part of the thermocouple circuit 104 in the embodiment shown in FIG. 2.

A plurality of traces 116, 118, 120 lead to a multi-pin connector 122 comprising a plurality of pins, $P_1$, $P_2$, $P_3$. Trace 118 terminates at pin $P_2$, where a reference voltage $V_{REF}$ is applied to both the heater circuit 102 and the voltage divider circuit 112. Trace 116 is coupled to the output of the amplifier 114 in the thermocouple circuit 104 and terminates at pin $P_1$ where an output voltage $V_{LL}$ can be read. The output voltage $V_{LL}$ is indicative of the liquid level that is sensed by the liquid level sensor module 100. Trace 120 terminates at pin $P_3$ which is connected to ground.

In operation, the reference voltage $V_{REF}$ applied to the heater circuit 102 raises the temperature of the heaters 106 above the ambient temperature. Thermal energy from the heaters 106 is conducted to the hot thermocouple junctions 108, which are in relatively close proximity to the heaters 106. Each hot thermocouple junction 108 generates a voltage potential when heated, the magnitude of which increases with increases in its temperature. The hot thermocouple junctions 108 are connected in series and the voltage potential generated by each hot thermocouple junction 108 is additive to the others. The total voltage potential generated when the liquid level sensor module 100 is not immersed in liquid, $V_{NI}$, equals n times the potential generated by a single hot thermocouple junction, where n is the number thermocouple junctions.

However, when a hot thermocouple junction 108 is immersed in a liquid, the liquid's greater thermal transfer efficiency (as opposed to gaseous fluids) reduces the amount that the hot thermocouple junction 108 is heated by the heater 106. Hence, it generates a lower voltage potential than it would were it not immersed in the liquid. Correspondingly, the total voltage potential for all of the thermocouple junctions is reduced. When the total voltage potential, then, falls below $V_{NI}$ it is indicative of the sensor's presence in a liquid environment. As more of the thermocouple junctions become immersed in the liquid, the total voltage potential continues to decrease until it reaches a value $V_{FI}$, which is the point at which all of the thermocouples are fully immersed in the fluid.

Ambient temperature, however, influences the amount of heat that is conducted to the hot thermocouple junctions. Hence, the voltage potential generated by the hot thermocouple junctions 108 is also affected by ambient temperature. To account for ambient temperature variations, the thermocouple circuit 104 includes corresponding cold thermocouple junctions 110 for each of the hot thermocouple junctions 108. The cold thermocouple junctions 110 are not located in proximity to the heaters 106 and, therefore, thermal energy from the heaters 106 is not conducted to the cold thermocouple junctions 110. The cold thermocouple junctions 110 remain at ambient temperature.

To account for variations in ambient temperature, then, each cold thermocouple junction 110 is wired in the thermocouple circuit so as to generate a voltage potential that is of opposite polarity to that of its associated hot thermocouple junction 108. Because the cold thermocouple junctions 110 are interconnected in an alternating series relationship with the hot thermocouple junctions 108, their opposite polarity voltage potentials subtract from the voltage potentials that are generated by the hot thermocouple junctions 108. As one having ordinary skill in the art will appreciate, the summation of the hot and cold thermocouple junctions' 108, 110 voltage potentials result in the output voltage, $V_{LL}$, which is not only indicative of the liquid level sensed by sensor module 14, but also eliminates the ambient temperature's influence on the output.

The liquid level sensor module 100 example shown schematically in FIG. 2 provides sensing capabilities for four discrete liquid levels (i.e., it has four pairs of hot and cold thermocouple junctions 108, 110). Alternatively, the multi-function sensor of the invention may incorporate a liquid level sensor module that simply senses whether a threshold fluid level has been attained. One such liquid level sensor is shown and described in U.S. Pat. No. 6,862,932 entitled "Liquid Level Sensor," issued Mar. 8, 2005 and owned by Therm-O-Disc, Incorporated, the assignee of the present patent application, the disclosure of which is hereby incorporated by reference. In particular, at col. 10, line 55 through col. 14, line 2, U.S. Pat. No. 6,862,932 describes a liquid level sensor operating on the same principles as the liquid level sensor described above, but utilizing only a single pair of thermocouple junctions, one "hot" and one "cold." An output voltage of a first value is associated with the immersion of the sensor in the liquid and indicates that the level of the liquid has reached or exceeded a threshold level. An output voltage of a second, higher value indicates that the liquid has fallen below the threshold level.

Referring now to FIGS. 3-6, a turbidity sensor module 200 for use in the multi-function sensor 10 of the invention is schematically shown and described. The turbidity sensor module 200 senses the state of cleanliness (or conversely "dirtying") of a fluid. Generally speaking, the turbidity sensor module 200 utilizes a light beam propagating through a fluid to determine, for example, whether the fluid is clouded by particulate matter that is suspended in the fluid. The extent to which the light is transmitted, reflected or scattered through the fluid, correlates to and may be calibrated to measure the relative turbidity of the fluid.

Figure 3:
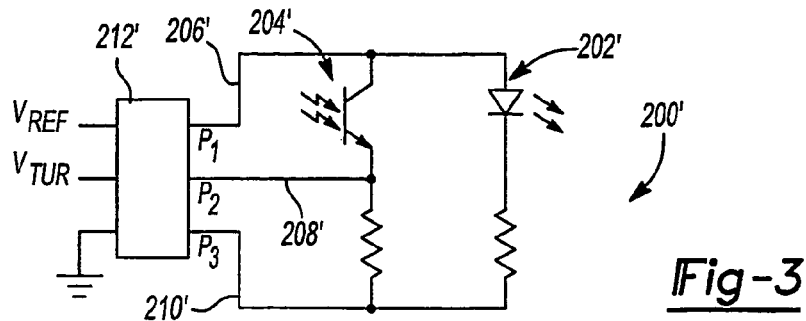
FIG. 3 is a schematic circuit diagram of an exemplary reflective-mode turbidity sensor module of the multi-function sensor of the invention.

FIG. 3 shows a schematic circuit diagram of a first embodiment of an exemplary turbidity sensor module 200'. The turbidity sensor module 200' comprises a reflective mode-type optical sensor. The turbidity sensor module 200' incorporates a light source 202', such as a light emitting diode (LED), that propagates a light signal, such as an infra-red light signal for example. A photosensor 204', such as a photodiode or phototransistor, is paired with the light source 202' and is arranged electrically in parallel to the light source 202'. The photosensor 204' is included in the turbidity sensor module 200' to detect the intensity of the light that is reflected by the fluid in which it is disposed.

Generally speaking, the photosensor 204' acts as a variable resistor, decreasing in resistance as the amount of reflected light being detected increases. The greater the turbidity the fluid, the greater amount of light that is reflected by the fluid and detected by the photosensor 204'. Thus, the higher the turbidity, the lower the resistance of the photosensor 204'.

The light source 202' and photosensor 204' components that may be employed in the turbidity sensor module 200' of the invention are well-known and commercially available. Components which are suitable for incorporation into the turbidity sensor module 200' include a surface mount LED which is available from Fairchild Semiconductor under part no. QEB421 and a surface mount silicon phototransistor also available from Fairchild Semiconductor under part no. QSB320. The LED and photosensor components are generally mounted on a substrate in a relationship that is preferably either at a right angle (i.e., at 90°) or side-by-side (i.e., at 180°).

Referring again to FIG. 3, the turbidity sensor module 200' includes a plurality of traces 206', 208', 210' that lead to a multi-pin connector 212' comprising a plurality of pins, $P_1$, $P_2$, $P_3$. Trace 206' terminates at pin $P_1$, where a reference voltage $V_{REF}$ is applied to the light source 202' and one side of the photosensor 204'. Trace 208' is coupled to the other side of the photosensor and terminates at pin $P_2$ where an output voltage $V_{TUR}$ can be read. The output voltage $V_{TUR}$ is indicative of the turbidity of the fluid as sensed by the turbidity sensor module 200'. Trace 210' terminates at pin $P_3$ which is connected to ground.

The turbidity sensor module 200' operates as follows. The reference voltage $V_{REF}$ is applied to the circuit and powers the light source 202'. Light emitted by the light source 202' propagates through the fluid. Any particulate matter that may be suspended in the fluid reflects at least some of the light back in the direction of the photosensor 204', where it is detected. The reflected light that is detected by the photosensor 204' causes an output voltage taken across the photosensor, $V_{TUR}$, to increase from a baseline value, which is less than $V_{REF}$. Once calibrated, the output voltage $V_{TUR}$ is correlated to the turbidity measurement of the fluid.

Figure 4:
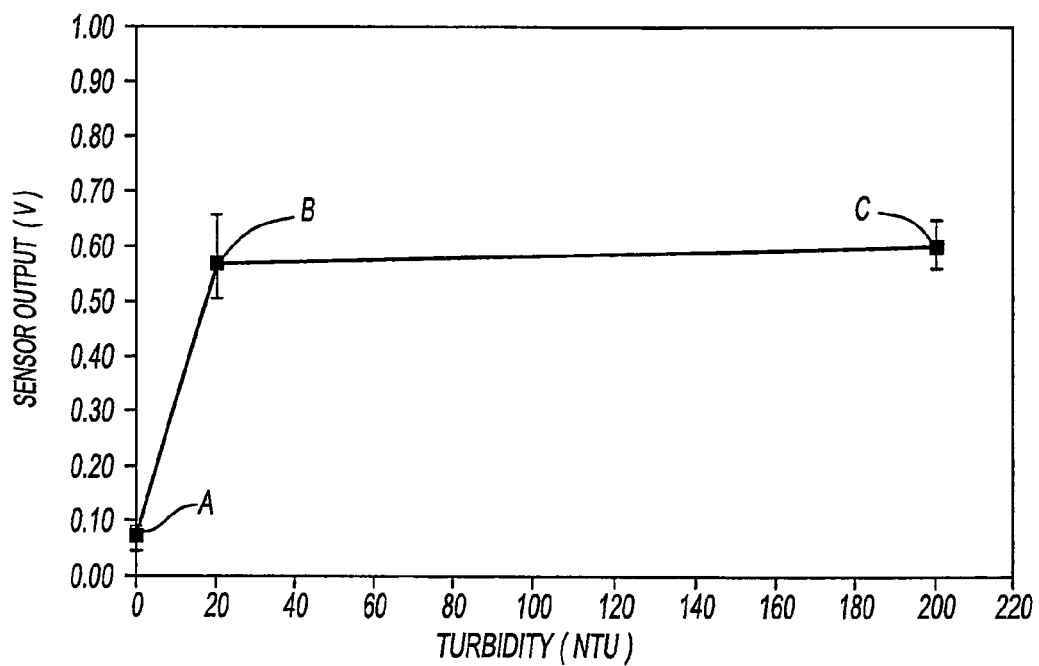
FIG. 4 is a graph illustrating the output of the reflective-mode turbidity sensor module of FIG. 3 for three exemplary turbidity levels.

FIG. 4 shows a graph illustrating the output in volts (V) versus turbidity (measured as nephelometric turbidity units (NTUs)) of a reflective-mode turbidity sensor module 200' constructed in accordance with the invention as shown in FIG. 3. Samples of fluid having known turbidity levels of 0 NTU, 20 NTU and 200 NTU were obtained. The sensor module 200' was subjected to each of the fluid samples. The reference voltage $V_{REF}$ applied to the turbidity sensor module 200' was 5 volts. Corresponding output voltages $V_{TUR}$ were measured for each of the fluid samples. Averages of several trials are shown at points A, B and C.

Figure 5:
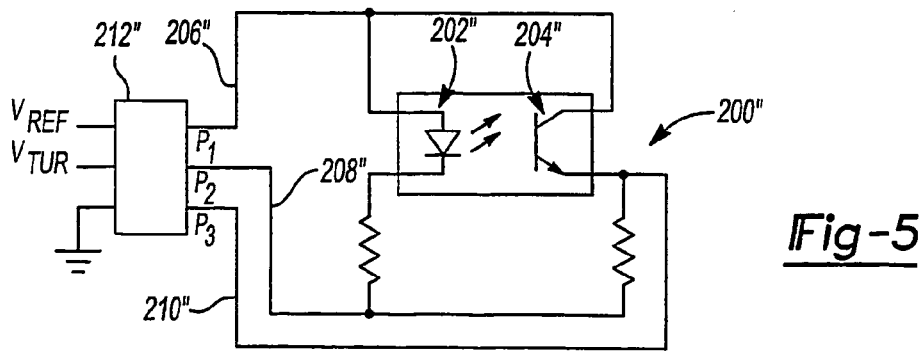
FIG. 5 is a schematic circuit diagram of an exemplary transmissive-mode turbidity sensor module of the multi-function sensor of the invention.

Turning to FIG. 5, a schematic circuit diagram of another embodiment of an exemplary turbidity sensor module 200" for use with the invention is shown. The turbidity sensor module 200" comprises a transmissive mode-type optical sensor which operates to detect the intensity of the light that is transmitted through the fluid in which it is disposed. The lower the turbidity of the fluid, the greater amount of light that is transmitted and detected by the photosensor. As turbidity of the fluid increases, so does the resistance of the photosensor.

The transmissive mode-type optical sensor of the turbidity sensor module 200" comprises a light source 202" and photosensor 204" that are paired together and packaged as a single component. The light source and photosensor are arranged in the package opposite to one another (i.e., at 0°). Transmissive mode-type optical sensors that are suitable for use in the turbidity sensor module 200" include optical switches which are commercially available from Fairchild Semiconductor under part no. CNY36 or from Optek Technology, Inc. under part no. OPB621.

As shown in FIG. 5, the turbidity sensor module 200" includes a plurality of traces 206", 208", 210" that lead to a multi-pin connector 212" comprising a plurality of pins, $P_1$, $P_2$, $P_3$. Trace 206" terminates at pin $P_1$, where a reference voltage $V_{REF}$ is applied to the light source 202" and one side of the photosensor 204". Trace 210" is coupled to the other side of the photosensor 204" and terminates at pin $P_3$ where an output voltage $V_{TUR}$ can be read. The output voltage $V_{TUR}$ is indicative of the turbidity of the fluid as sensed by the turbidity sensor module 200". Trace 208" terminates at pin $P_2$ which is connected to ground.

When the reference voltage $V_{REF}$ is applied to the circuit, the light source 202" emits light which propagates through the fluid and in the direction of the photosensor 204". Particulate matter that may be suspended in the fluid causes some of the light to be reflected or scattered, preventing it from reaching the photosensor 204". The light that is transmitted through the fluid is detected by the photosensor 204". When the turbidity of the fluid is low, light from the light source 202" is not impeded from reaching the photosensor 204". The photosensor 204", therefore, provides low resistance with little drop in voltage. The output voltage $V_{TUR}$ approaches $V_{REF}$. As the turbidity of the fluid increases, more and more light is reflected or scattered and does not reach the photosensor 204". In such cases, the photosensor's 204" resistance also increases and the output voltage $V_{TUR}$ is reduced.

Figure 6:
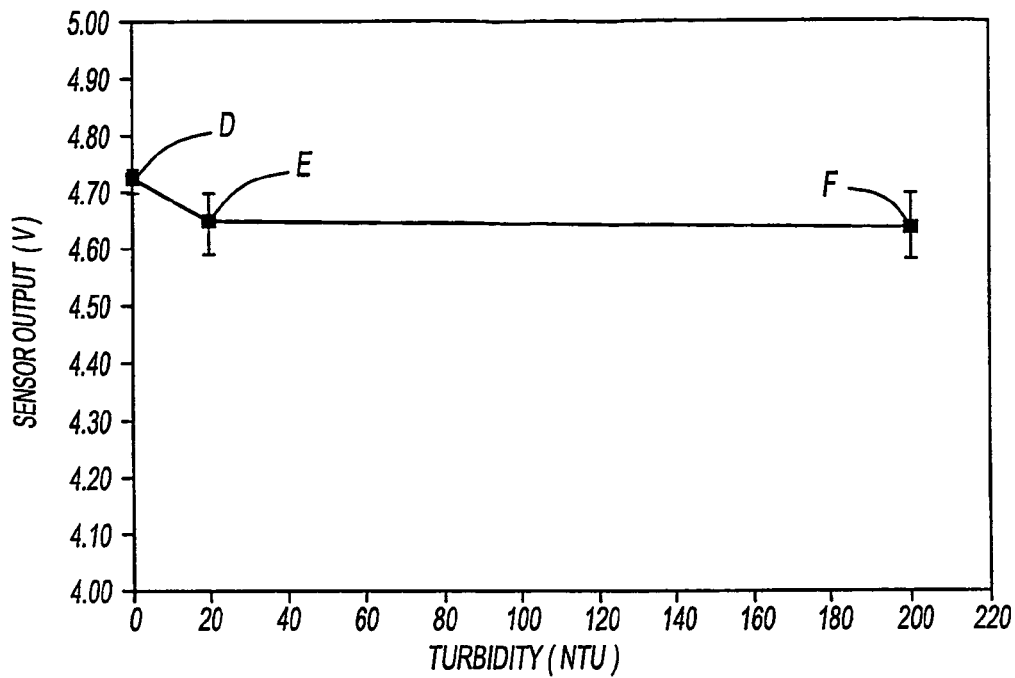
FIG. 6 is a graph illustrating the output of the transmissive-mode turbidity sensor module of FIG. 5 for three exemplary turbidity levels.

FIG. 6 is a graph illustrating the output in volts (V) versus turbidity (NTUs) of the transmissive-mode turbidity sensor module 200" constructed in accordance with the invention as shown in FIG. 5. The same three samples of fluid of known turbidity levels 0 NTU, 20 NTU and 200 NTU were used and the results obtained. The reference voltage $V_{REF}$ applied to the turbidity sensor module 200" again was 5 volts. Corresponding output voltages $V_{TUR}$ were measured for each of the fluid samples. Averages of several trials are shown at points D, E and F.

In certain applications for the multi-function sensor 10, it may be necessary to sense the pressure in the ambient environment. Alternatively, the multi-function sensor 10 may be employed in an environment where it is subjected to such wide variations in pressure that the accuracy of its outputs relative to other sensed conditions such as liquid level, for example, are impaired. Thus it may be desirable to provide an output from the multi-function sensor 10 indicative of the ambient pressure within the environment.

Figure 7:
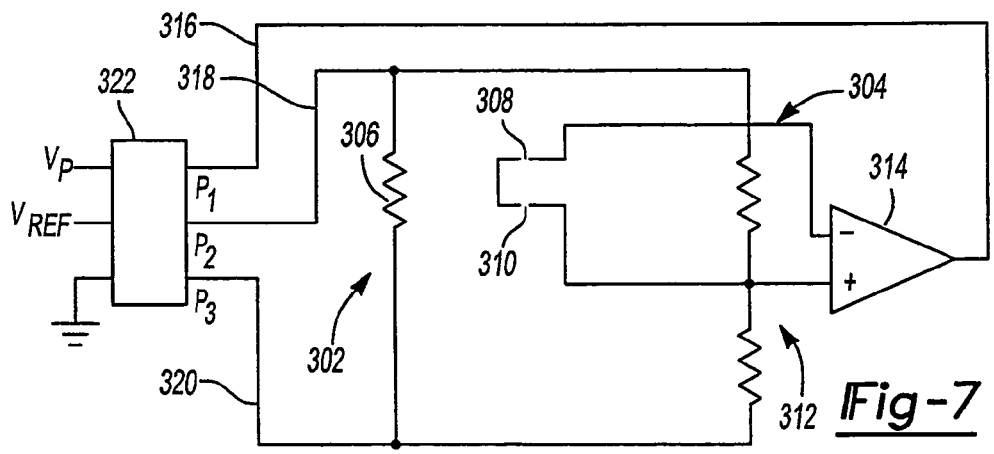
FIG. 7 is a schematic circuit diagram of an exemplary pressure sensor module of the multi-function sensor of the invention.

A pressure sensor module 300 suitable for use with the multi-function sensor 10 of the invention can incorporate a pair of hot and cold thermocouples, as shown and described in U.S. Pat. No. 6,546,796 at col. 6, line 3 through col. 7, line 10, which is hereby incorporated by reference. FIG. 7 shows a schematic circuit diagram of an exemplary pressure sensor module 300. The pressure sensor module 300 generally comprises a heater circuit 302 and thermocouple circuit 304. The heater circuit 302 includes a discrete heater 306, such as a resistor. The thermocouple circuit comprises a "hot" 308 and a "cold" 310 thermocouple junction, which are connected in series, a voltage divider 312 and an amplifier 314.

A plurality of traces 316, 318, 320 of the pressure sensor module 300 lead to a multi-pin connector 322 comprising a plurality of pins, $P_1$, $P_2$, $P_3$. Trace 318 terminates at pin $P_2$, where a reference voltage $V_{REF}$ is applied to both the heater circuit and the voltage divider circuit. Trace 316 is coupled to the output of the amplifier 314 in the thermocouple circuit 304 and terminates at pin $P_1$ where an output voltage $V_P$ can be read. The output voltage $V_P$ is indicative of the pressure that is sensed by the pressure sensor module 300. Trace 320 terminates at pin $P_3$ which is connected to ground.

In operation, when the reference voltage $V_{REF}$ is applied to the heater circuit 302 the temperature of the heater 306 is raised above the ambient temperature. Thermal energy from the heater 306 is conducted to the hot thermocouple junction 308, which is located in relatively close thermal proximity to the heater 306. The cold thermocouple junction 310 is relatively laterally offset from the hot thermocouple junction 308 and the heater 306. An output voltage $V_P$ measured at $P_1$ is indicative of the pressure being sensed and is compensated for temperature. More specifically, the heater 306 transfers heat to the hot thermocouple junction 308, which generates a potential indicative of its temperature. The heating of the hot thermocouple junction 308 by the heater 306, however, is offset by heat radiated or otherwise transferred to the surrounding environment. The rate at which heat is transferred to the surroundings is dependent upon ambient pressure. That is, a greater amount of heat will be transferred to the surroundings when the surroundings are at higher pressure. Thus, the potential generated by the hot thermocouple junction 308 decreases as pressure increases. The pressure sensor module 300 of the multi-function sensor 10 of the invention provides an output voltage $V_P$ that is indicative of the ambient pressure within the environment.

The output voltage $V_P$ may be used for a variety of purposes, including providing an overpressure alarm or to generate a correction factor for other outputs of the multi-function sensor 10. If desired for a particular application, the output from pressure sensor module 300 may be supplied to suitable signal conditioning circuitry such as that described herein. Such signal conditioning circuitry may be incorporated onto circuit board 12 or may be located at a remote location.

Figure 8:
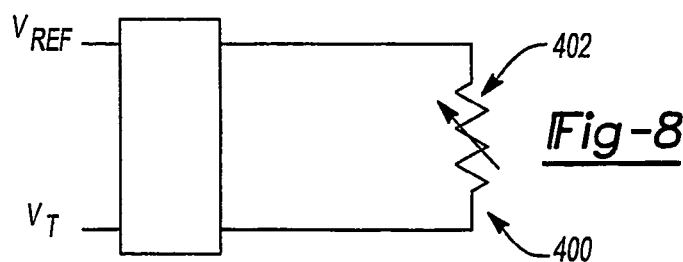
FIG. 8 is a schematic circuit diagram of an exemplary temperature sensor module of the multi-function sensor of the invention.

FIG. 8 shows a schematic circuit diagram of an exemplary temperature sensor module 400 for use in the multi-function sensor 10. The temperature sensor module 400 may comprise a low profile, surface mount chip thermistor 402 or some other type of temperature dependent, variable resistor. An exemplary surface mount chip thermistor that is suitable for use in the multi-function sensor 10 is commercially available from Panasonic under part no. ERT-J1VV104J. As shown in FIG. 8, an output voltage $V_T$ is measured across the thermistor when a reference voltage $V_{REF}$ is applied to the circuit. The output voltage $V_T$ can be calibrated to correspond to read the ambient temperature.

In order to ensure accurate and consistent readings from the multi-function sensor 10, it is important that the voltage applied to the sensor modules 100, 200, 300, 400, 500 be closely regulated (preferably +/−1%). As is known in the art, this may be accomplished by providing suitable power supply regulating circuitry on the circuit board 12. Alternatively a remote regulated source of power which supplies power to the multifunction sensor may be provided.

While the voltage outputs from the multi-function sensor 10 both have a high degree of resolution and have an excellent signal-to-noise ratio, one or more of the voltage outputs may benefit from additional manipulation for a particular application. It is therefore contemplated that conditioning one or more of the outputs from the multi-function sensor 10 may be desirable. A signal conditioning circuit can comprise amplifiers, filters, or similar components. A suitable signal conditioning circuit is shown and described in FIG. 4 of U.S. Pat. No. 6,546,796 and the discussion related thereto at col. 5, line 31 to col. 6, line 2, which is hereby incorporated by reference. It should be appreciated that this or another suitable signal conditioning circuit can be used with the multi-function sensor 10 of the invention.

Either or both the power supply regulating circuitry and the signal conditioning circuitry, as desired, may be integrated onto the printed circuit board 12 of the multi-function sensor 10. Alternatively, such circuitry can be disposed on the substrate of a separate printed circuit board component, like a lead-frame, that is coupled to both the multi-function sensor 10 and other hardware associated with the sensor, like control electronics or a power supply, for example. The lead-frame can then be disposed at a location remote from the sensed environment, leaving only the sensor modules within the environment where conditions are to be sensed.

Figure 9:
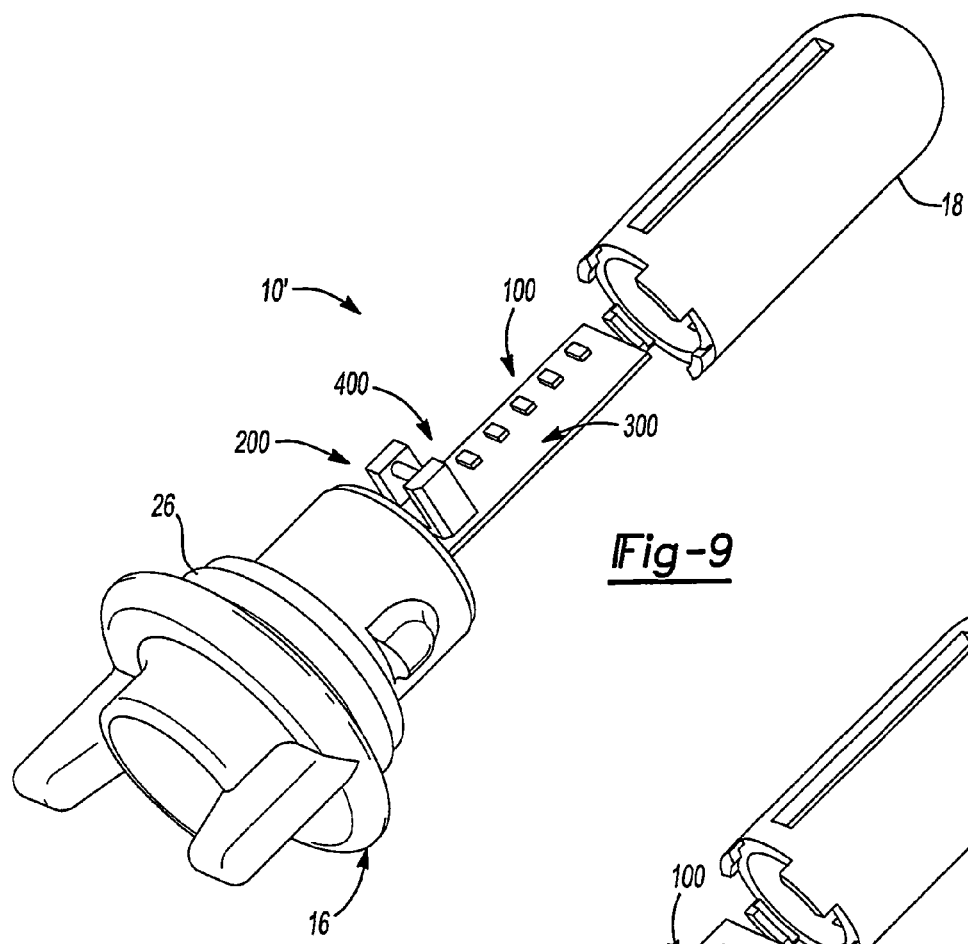
FIG. 9 is an exploded perspective view of one embodiment of the multi-function sensor of the invention.
Figure 10:
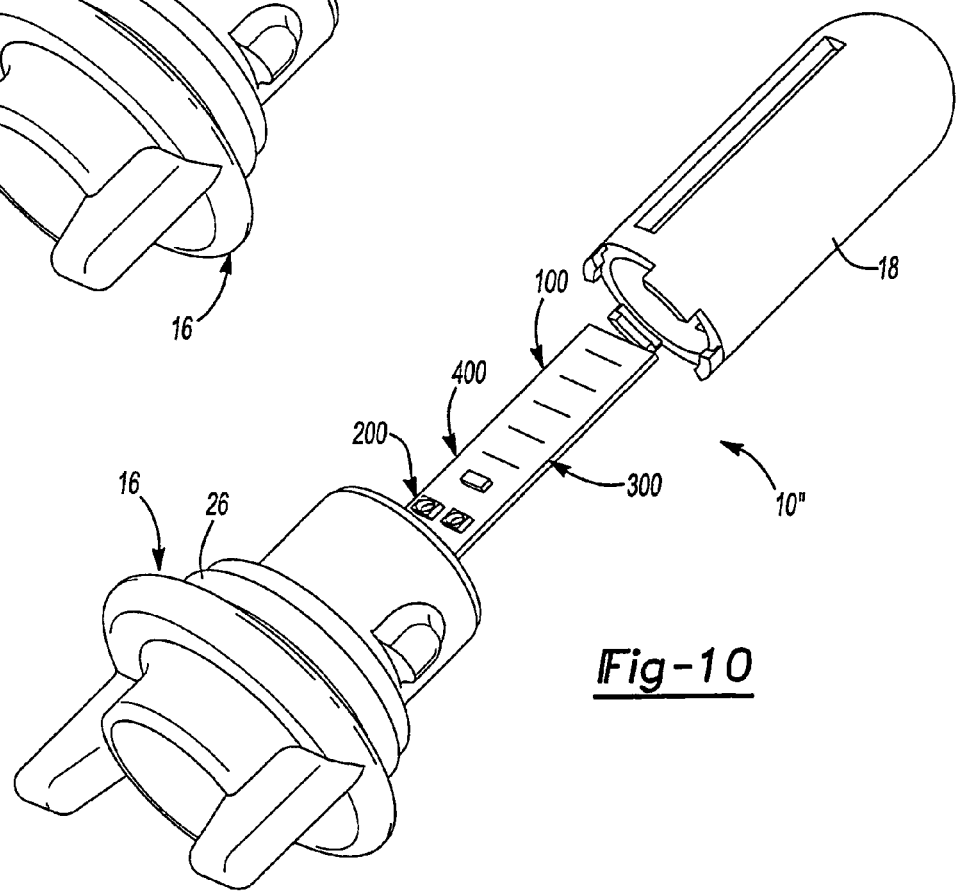
FIG. 10 is an exploded perspective view of another embodiment of the multi-function sensor of the invention.

FIGS. 9 and 10 show exploded perspective views of two exemplary embodiments of the multi-function sensor 10 of the invention.

Figure 11:
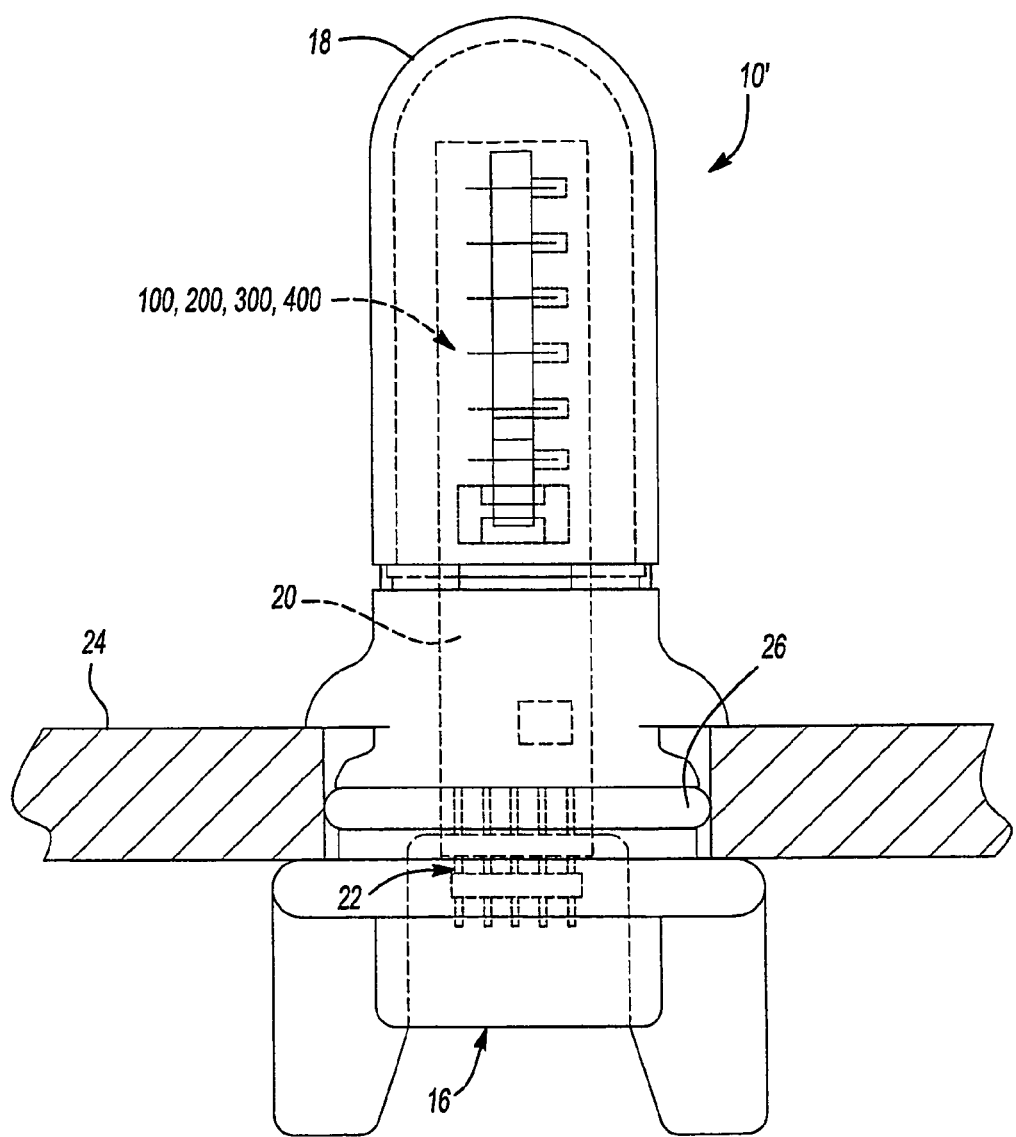
FIG. 11 is a cross-sectional front view of a multi-function sensor of the invention, such as that shown in FIG. 9 or 10, which is installed through the wall of an appliance.

As shown in the figures, the exemplary multi-function sensors 10', 10" are each attached to a base 16 and may include and a protective shield 18. A lead-frame 20 comprising a multi-pin connector 22 serves to provide a connection between the multi-function sensor 10', 10" and control electronics (not shown) of the device employing the sensor. In addition, as already discussed, the lead-frame may include power regulating and/or signal conditioning circuitry for the multi-function sensor. FIG. 11 shows a cross-sectional front view of a multi-function sensor 10' of the invention, such as that shown in FIG. 9, which is installed through the wall 24 of an appliance. The multi-function sensor 10' may be housed in, for example, a dishwasher tub. An O-ring 26 located on the base 16 provides a seal to prevent fluid from leaking at the installation location of the sensor 10'.

The inclusion and arrangement of any combination of the sensor modules 100, 200, 300, 400 depend on the application for the sensor. For example, if the level, turbidity and temperature of the wash water in a dishwasher is to be monitored, then those sensor modules would be disposed such that they are submersed in the water during normal operation.

Figure 17:
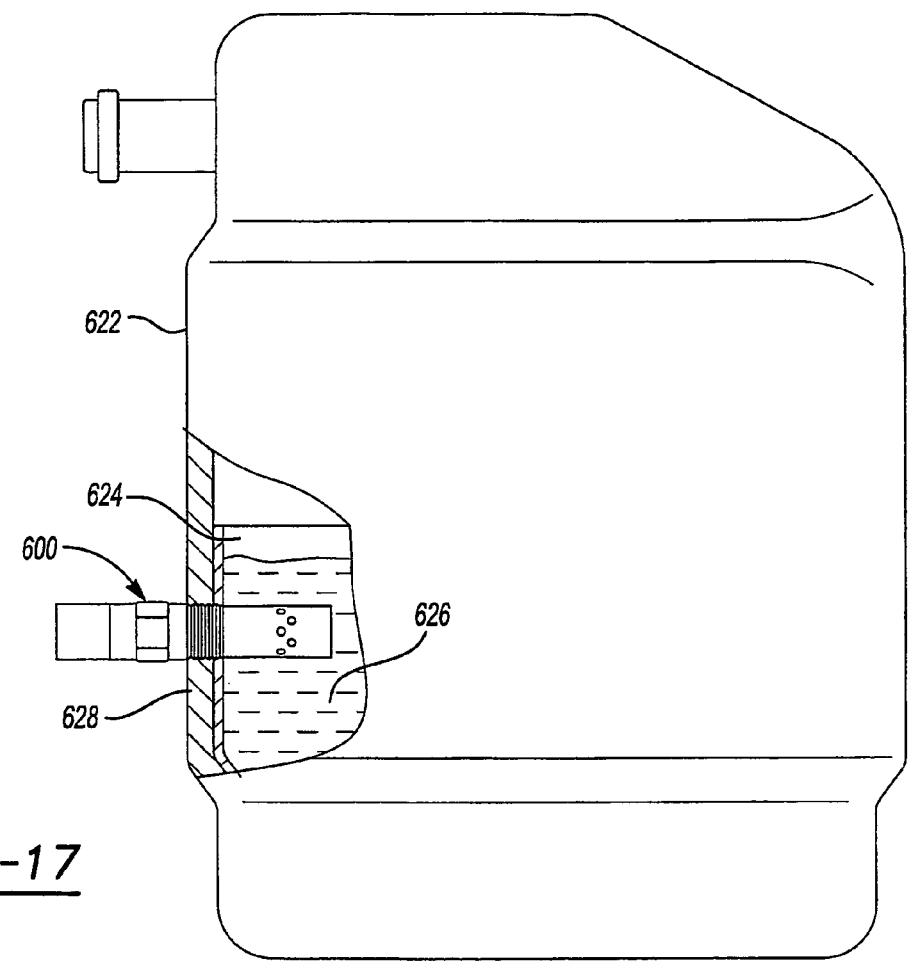
FIG. 17 is a view of a sealed vessel, such as a hermetic compressor, having a multi-function sensor in accordance with the invention installed therein.

Turning now to FIGS. 12-17, a hermetic interface 300 for use in combination with the multi-function sensor 10 of the invention is shown. As depicted in FIG. 17, the hermetic interface provides the multi-function sensor 10 with the ability to transmit its outputs through the wall of a closed, highly pressurized vessel, while still maintaining the sealed nature of the vessel.

Figure 12:
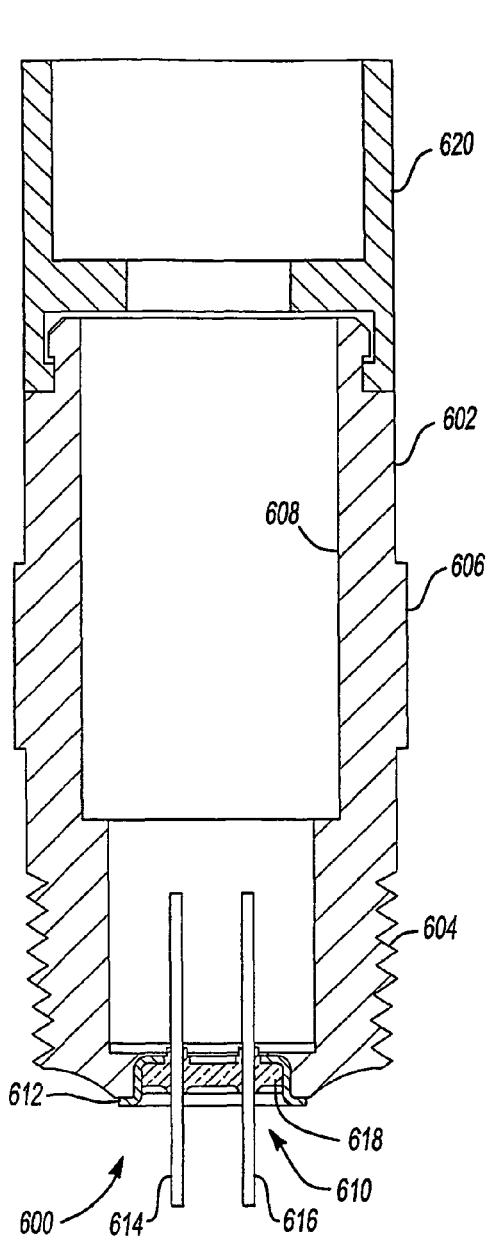
FIG. 12 is a cross-sectional front view of a hermetic interface that may be used with the multi-function sensor of the invention.

As shown in FIG. 12, the hermetic interface 600 includes a generally elongate cylindrical housing 602 having external screw threads 604 at one end and flats 606 to accommodate a wrench, for example. A bore 608 extends the length of the housing 602. At one end of the bore 608 is a hermetically sealed electrical feedthrough 610 comprising a metallic body 612 through which extend a plurality of current conducting pins 614, 616 that are hermetically sealed in the body 612 by a glass-to-metal seal 618. The feed through 610 is fit into the bore 608 and hermetically sealed to the housing 602, such as by welding, brazing, solder, epoxy, other mechanical fastening or any suitable means. An end cap 620 may also be attached to the hermetic interface 600 at its end opposite the screw threads 604.

The multi-function sensor 10 connects to pins 614, 616 by a suitable means such as welding, mechanical fastening or any suitable means of attachment including epoxy or solder, or a combination thereof. Although only two pins 614, 616 are illustrated, this is merely exemplary and any number of pins that are required may be included in the interface.

Once assembled with the hermetic interface 600, the multi-function sensor 10 may be used in a highly pressurized vessel 622 having a sealed compartment 624 (as shown in FIG. 17, for example) for determining the presence of a predetermined amount of fluid 626 while concurrently maintaining the sealed nature of the vessel 622. Although the hermetic interface 600 is shown to be attached to the vessel 622 by threaded engagement with a wall 628 of the vessel 622, it should be noted that any suitable means for attaching the hermetic interface 600 to the vessel 622 that concurrently maintains the sealed relationship of the hermetic interface 600 with the opening, such as welding or epoxy, may also be used.

Figure 13:
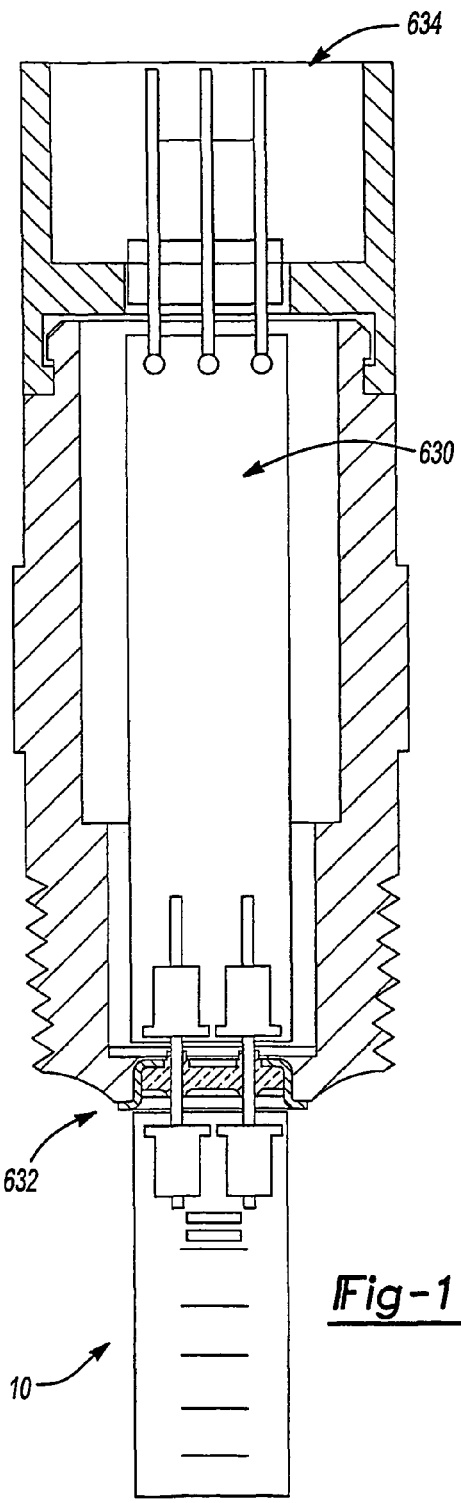
FIG. 13 is a cross-sectional front view of the hermetic interface of FIG. 12 and including a multi-function sensor of the invention disposed therein.
Figures 14, 15, 16:
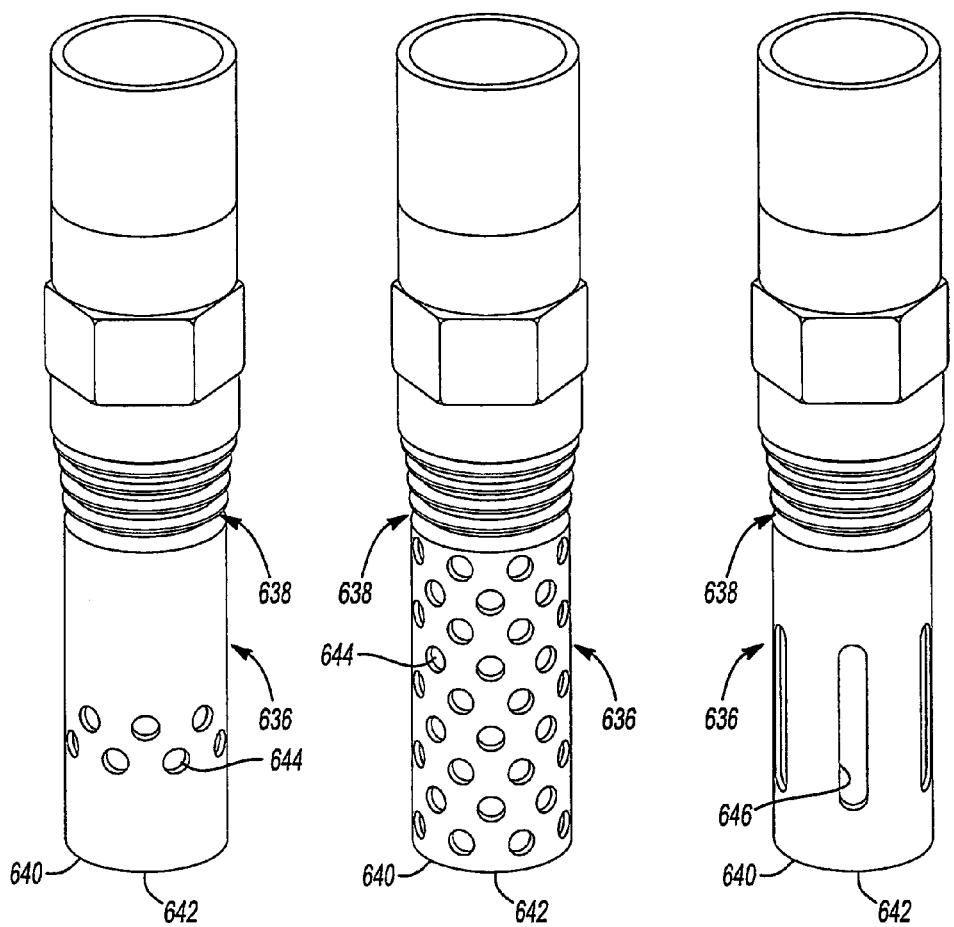
FIG. 14 is a front view of the hermetic interface of FIG. 12 having a first protective shield disposed thereon.
FIG. 15 is a front view of the hermetic interface of FIG. 12 having a second protective shield disposed thereon.
FIG. 16 is a front view of the hermetic interface of FIG. 12 having a third protective shield disposed thereon.

As best illustrated in FIG. 13, the housing 602 of the hermetic interface 600 is adapted to receive within its bore 608 the lead-frame 630. The lead-frame 630 connects to the multi-function sensor 10 at a multi-pin connector 632.

Although only two pin connections are shown, the particular number of pin connections can vary as necessary. At the opposite end, the lead-frame 630 connects to a connector plug 634. By way of the lead-frame 630, the outputs from the multi-function sensor 10 can ultimately be supplied to suitable remotely located processing and/or display devices for monitoring and/or recording the various conditions being sensed by the multi-function sensor 10, for example.

As shown in FIGS. 14-17, a protective shield 636 may be provided to prevent damage to the sensor 10. The shield 636 also serves to dampen the changes in liquid level which may occur as a result of movement of the vessel within which the liquid is contained and/or agitation of the liquid resulting from movement of apparatus within the liquid containing vessels which could cause inaccurate readings by the sensor 10.

The shield 636 is a generally cylindrical member having a proximate end 638 fixedly attached to the housing 602 and a distal end 640 extending away from the housing 602. The shield 636 further includes a central bore 642 extending along its length (and may be optionally open or closed at its distal end 640), whereby the bore 642 is operable to receive the sensor. The shield 636 includes a plurality of apertures, like holes 644 or slots 646, to allow the liquid 626 to flow into and out of the bore 642 at a predetermined rate for interaction with the sensor. The specific number of apertures as well as their size may be varied depending on the viscosity of the liquid whose level is to be sensed as well as the degree of anticipated agitation of the liquid and desired responsiveness of the sensor. That is to say, increasing the number and/or size of the apertures will enable the sensor to respond more rapidly to changes in liquid level but may result in a greater number of errors due to transient changes in the liquid level resulting from agitation of the liquid. Similarly, fewer and/or smaller holes will result in reduced sensitivity to agitation of the liquid but may increase the time required to sense a sudden drop in the liquid level.

The shield 636 may be fabricated from any material suitable for the environment within which it may be utilized including for example polymeric compositions or various metals. Alternatively, the shield 636 may be integrally formed with a portion of the vessel within which the liquid is contained or as part of other apparatus disposed within the vessel. It should also be noted that the shield may in some applications be in the form of a suitably shaped container sufficient to minimize or eliminate splashing of the liquid in the proximity of the sensor which could result in erroneous level readings or if splashing is not of concern, the shield or container may be eliminated in its entirety.

As shown in FIG. 17, the multi-function sensor 10 can be secured to the wall 628 in a position so as to be particularly immersed in the fluid 626 contained in the compartment 624. The multi-function sensor 10 then can operate to provide signal(s) indicative of ambient conditions within the vessel 622, such as temperature, fluid turbidity and whether the fluid is being maintained at a threshold level, for example. It should be noted that if desired, sensor 10 may be connected to suitable remotely located apparatus to sound an alarm, de-energize a device, or both, in response to an indication to any one of the conditions being sensed such as, for example, that the fluid level has dropped below a predetermined minimum, a desired temperature has been exceed, etc.

Another sensor module that can be used in a multi-function sensor 10 of the invention is a fluid flow rate sensor module 500. One type of fluid flow rate sensor module 500 that is suitable to be integrated into a multi-function sensor 10 in accordance with the invention is a thermo-anemometer-type fluid flow rate sensor. Such a device and method for its operation is shown and described in co-pending U.S. patent application entitled "Fluid Flow Rate Sensor and Method of Operation," Ser. No. 10/963,750, filed Oct. 13, 2004 and owned by Therm-O-Disc, Incorporated, the assignee of the present patent application, the disclosure of which is hereby incorporated by reference.

Figure 18:
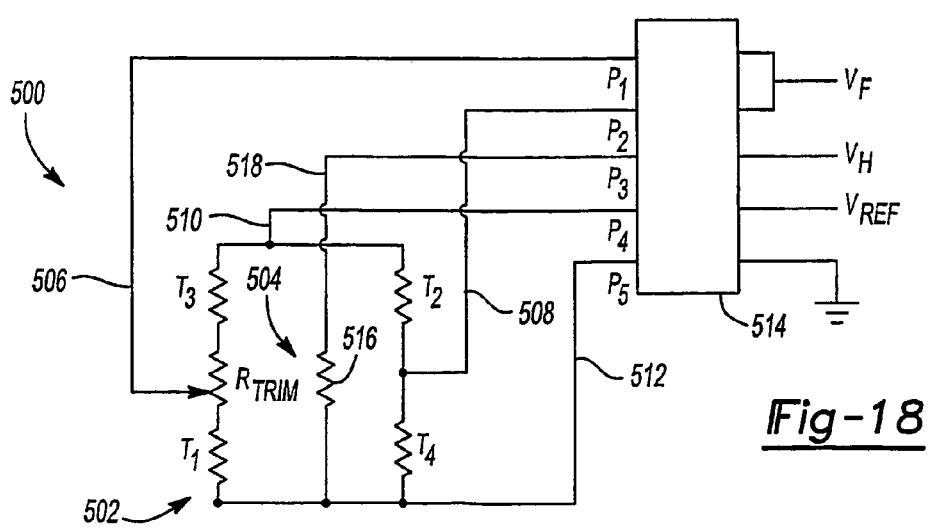
FIG. 18 is a schematic circuit diagram of an exemplary fluid flow rate sensor module of the multi-function sensor of the invention.

FIG. 18 shows a schematic circuit diagram of an exemplary fluid flow rate sensor module 500 that can be incorporated in the multi-function sensor 10 of the invention. The fluid flow rate sensor module 500 comprises a detection circuit 502 and a heating circuit 504.

The detection circuit 502 comprises a plurality of NTC thermistors $T_1$, $T_2$, $T_3$, $T_4$ that together form a 4-wire bridge circuit. The thermistor $T_1$ is coupled in series with thermistor $T_3$ to form one leg of the bridge and thermistor $T_2$ is coupled in series with thermistor $T_4$ to form the other leg of the bridge. Together, thermistor $T_1$ and thermistor $T_3$ are coupled in parallel with thermistor $T_2$ and thermistor $T_4$. An optional trim resistor $R_{trim}$ is included in series with thermistors $T_1$ and $T_3$ to enable the bridge circuit to be balanced, as is known in the art.

The detection circuit 502 also includes traces 506, 508, 510, 512 that lead to a multi-pin connector 514 having a plurality of pins $P_1$, $P_2$, ,P3, $P_4$, $P_5$. Trace 510 terminates at pin $P_4$, where a reference voltage $V_{REF}$ is applied to the circuit. Traces 506, 508 are respectively coupled to opposite legs of the circuit and terminate at pins $P_1$, $P_2$. A differential output voltage $V_F$, which can be calibrated to represent a temperature difference ($\Delta T$) across the bridge and between thermistors $T_1$ $T_3$ and thermistors $T_2$, $T_4$ as is well-known in the art, can be read at pins $P_1$, $P_2$. Trace 512 terminates at pin $P_5$ which is connected to ground.

The heating circuit 504 of the fluid flow rate sensor module 500 comprises a heater 516. Trace 518 of the heating circuit 504 terminates at pin $P_3$. A voltage $V_H$ to power the heating circuit 504 is applied at pin $P_3$. The heating circuit 504 is electrically insulated from the detection circuit 502, but not thermally insulated. The heater 516 is located proximate to thermistors $T_1$, $T_2$ such that thermal energy from the heater 516 is conducted to the thermistors $T_1$, $T_2$. Thermal energy from the heater 516 is not, however, conducted to thermistors $T_3$, $T_4$.

Figure 19:
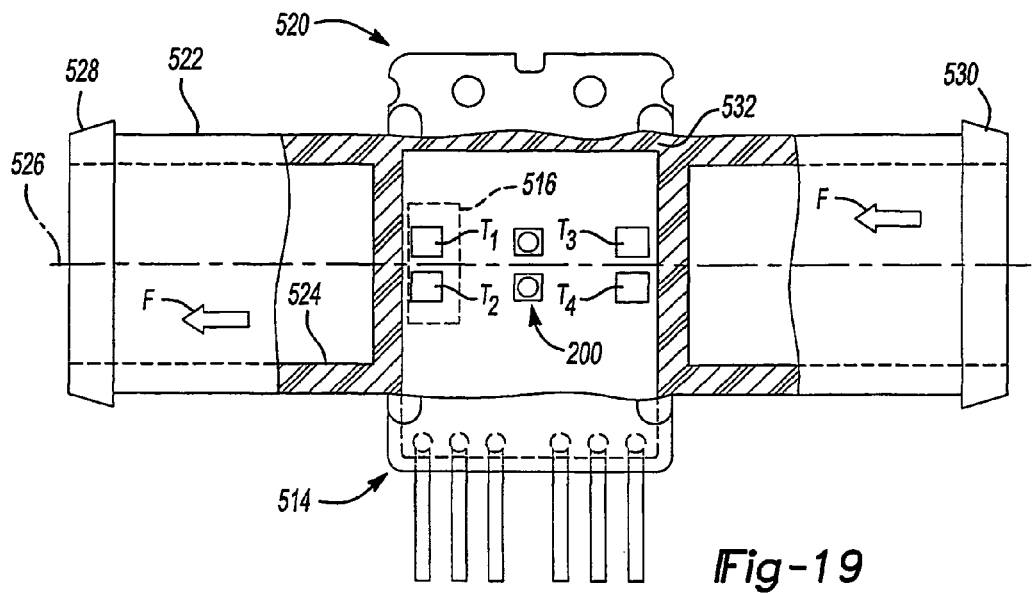
FIG. 19 is a front view, in partial cross-section, of another embodiment of the multi-function sensor of the invention.
Figure 20:
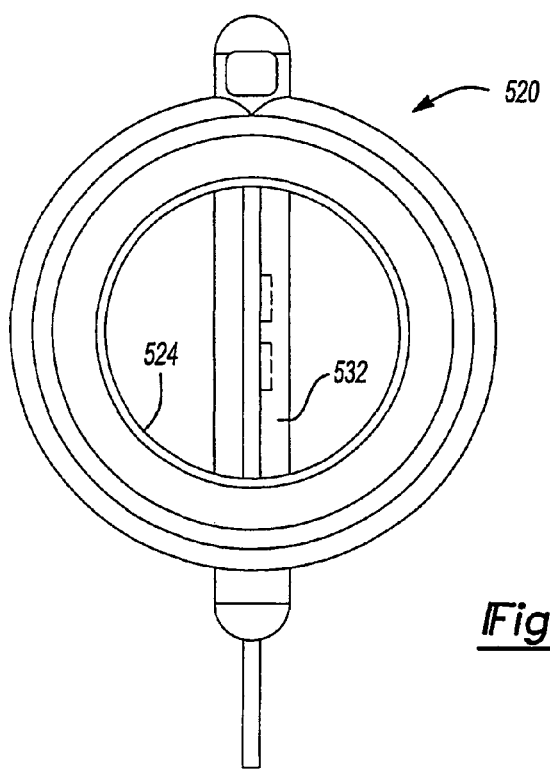
FIG. 20 is an end view of the embodiment of the multi-function sensor of FIG. 19.

The fluid flow rate sensor module 500 can be incorporated with one or more of the other sensor modules 200, 300 and 400 into a probe 520, as shown in FIGS. 19 and 20. FIG. 19 is a front view, in partial cross-section, of such an embodiment of a multi-function sensor of the invention. FIG. 20 is an end view of the multi-function sensor of FIG. 19.

The probe 520 generally comprises a body 522. The body 522, as shown, is a generally a cylindrically-shaped tubular member having a passageway 524 extending through its entire length along a longitudinal axis 526. Fluid is able flow through the passageway 524 of the body 522 in a direction along the longitudinal axis 526. Annular flanges 528, 530 may be located at opposite ends of the body 522 to facilitate connection of the probe 520 to a fluid source, such as the flexible supply hose of a water dispenser, for example.

Located intermediate the ends of the body 522 is a housing 532. The housing 532 extends through the body 522 in a direction generally perpendicular to the longitudinal axis 526. The housing 532 is disposed within the passageway 524. The shape of the housing 532 is designed to promote laminar flow of the fluid flow moving through the passageway 524 and across the surface of the housing 532. The sensor is received within the housing 532 such that the housing 532 encapsulates a portion of the sensor to protect it from physical contact with the fluid environment. The housing 532, however, is capable of conducting thermal energy from the fluid environment to the sensor.

Both the body 522 and the housing 532 are preferably manufactured from thermally conductive polymers, such as, for example, polypropelene, polyvinylchloride, polyacetylene, polyparaphenylene, polypyrrole, and polyaniline.

Ceramic and/or glass fillers mixed in with these base polymers have been shown to greatly enhance the material's thermal conductivity. One such material is known under the trade designation Konduit MT-210-14 and is available from GE/LNP.

The fluid flow rate sensor module 500 is generally received within the housing 532 such that it is perpendicular to the direction of fluid flow F through the passageway 524. Referring to FIGS. 19 and 20, the fluid flow rate sensor module's 500 is located within the housing 532 such that it lies within the passageway 524 of the body 522. The pin connectors $P_1$, $P_2$, $P_3$, $P_4$, $P_5$, however, extend outward from the housing 532. The detection circuit 502 and heating circuit 504 are arranged such that the thermistors $T_1$, $T_2$, $T_3$, $T_4$ and the heater 516 all lie within the passageway 524 of the body 522. Further, the arrangement of thermistors $T_1$, $T_2$, $T_3$, $T_4$ is such that the unheated thermistors $T_3$, $T_4$ lie upstream in the fluid from the heated thermistors $T_1$, $T_2$.

The use of four thermistors $T_1$, $T_2$, $T_3$, $T_4$ in the detection circuit 502 and the thermistors' $T_1$, $T_2$, $T_3$, $T_4$ physical arrangement in the passageway 524 of the body 522 provide further advantages. One significant advantage is that the differential output voltage $V_F$ is automatically compensated for ambient temperature changes, i.e., changes in the temperature of the fluid. This is important because if significant and/or rapid changes in the fluid temperature occur, they could distort the output of the sensor 10 causing the sensor 10 to give inaccurate results.

The differential output voltage $V_F$ of the fluid flow rate sensor module 500, however, represents a temperature difference ($\Delta T$) across the bridge and not an absolute temperature (T). This is because the unheated thermistors $T_3$, $T_4$ on opposite sides of the bridge of the circuit counter-act the impact on the differential output voltage $V_F$ caused by temperature changes in the fluid. Consequently, the compensated sensor module measures the change in relative temperature. From that temperature change, the fluid flow rate may be determined as taught in U.S. patent application entitled "Fluid Flow Rate Sensor and Method of Operation," Ser. No. 10/963,750, filed Oct. 13, 2004, which is hereby incorporated by reference.

Further improvements to optimize the thermal mass of the detection circuit 502 comprise utilizing a highly thermally conductive ceramic substrate upon which are screen printed a ceramic-filled carbon paste material that forms the thermistors $T_1$ through $T_4$. Such material is available from Heraeus Incorporated, Circuit Materials Division under the R100 Series designation. Such a configuration completely eliminates the discrete thermistor components in the detection circuit 502 and helps to reduce the thermal mass of the detection circuit 502.

Also, to improve the heat transfer characteristics and durability of the probe, it is contemplated that the housing 532 can be eliminated and a thin layer of a thermally conductive dielectric polymer or a glass material be applied directly to the sensor as a glaze to encapsulate and protect it from moisture and/or abrasion.

As may be appreciated, the multi-function sensor of the invention provides a relatively simple and reliable means for measuring and monitoring several conditions in an environment. The multi-function sensor of the invention is designed to provide continuous monitoring. The sensor is well suited for economical manufacturing and requires only a very limited space to accommodate it. Further, the sensor may offer a wide degree of resolution of the fluid level being sensed and may even accommodate increased resolution over a specific portion of the level range being sensed.

While it will be appreciated that the preferred embodiments of the invention disclosed are well calculated to provide the advantages and features above stated, it will be appreciated that the invention is susceptible to modification, variation and change without departing from the proper scope or fair meaning of the subjoined claims.

What is claimed is:

1. A multi-function sensor comprising:
    a fluid level sensor module;
    a turbidity sensor module;
    a temperature sensor module; and
    a pressure sensor module;
    wherein the temperature sensor module comprises a temperature dependent, variable resistor; and
    the pressure sensor module comprises a first electric circuit comprising a first thermocouple junction and a second thermocouple junction, said second thermocouple junction located in a spaced relationship from said first thermocouple junction; and
    a second electric circuit comprising a heat source for raising the temperature of said first thermocouple junction above an ambient temperature.

2. A multi-function sensor comprising:
    a fluid level sensor module; and
    a turbidity sensor module;
    wherein the fluid level sensor module comprises:
        a first electric circuit comprising a first thermocouple junction and a second thermocouple junction, said second thermocouple junction located in a spaced relationship from said first thermocouple junction; and
        a second electric circuit comprising a heat source for raising the temperature of said first thermocouple junction above an ambient temperature.

3. The multi-function sensor of claim 2 wherein the turbidity sensor module comprises a reflective-mode-type optical sensor comprising:
    a light source; and
    a photosensor; and wherein
    said photosensor measures an amount of reflected light from said light source.

4. The multi-function sensor of claim 2 wherein the turbidity sensor module comprises a transmissive-mode-type optical sensor comprising:
    a light source; and
    a photosensor paired with said light source; and wherein
    said photosensor measures an amount of transmitted light from said light source.

5. A multi-function sensor comprising:
    a fluid level sensor module; and
    a turbidity sensor module;
    wherein the fluid level sensor module comprises:
        a first electric circuit comprising:
            a plurality of first thermocouples provided in longitudinally spaced relationship; and
            a plurality of second thermocouples provided in longitudinally spaced relationship, respective ones of said plurality of second thermocouples being positioned in laterally spaced relationship to respective ones of said plurality of first thermocouples, said first and second thermocouples being electrically connected in an alternating series relationship; and
a second electric circuit comprising:
a heat source for raising the temperature of each of said plurality of first thermocouples above an ambient temperature.

6. A multi-function sensor comprising:
a fluid level sensor module;
a turbidity sensor module; and
an electrically insulating rigid substrate,
wherein said fluid level sensor module and said turbidity sensor module are located on said substrate, and further comprising an electrically insulating coating covering at least said fluid level sensor module.

7. The multi-function sensor of claim 6, wherein said electrically insulating coating comprises Parylene.

8. A multi-function sensor comprising:
a substrate having a longitudinal axis;
a plurality of first thermocouples provided on one side of said substrate in longitudinally spaced relationship;
a plurality of second thermocouples provided on said one side of said substrate in longitudinally spaced relationship to each other, respective ones of said plurality of second thermocouples being positioned in laterally spaced relationship to respective ones of said plurality of first thermocouples,
said first and second thermocouples being electrically connected in an alternating series relationship;
a heat source for increasing the temperature of each of said plurality of first thermocouples; and
a heat sink provided on said substrate in close proximity to said plurality of second thermocouples;
a light source located at one end of said substrate; and
a photosensor paired with said light source;
said sensor being adapted to generate at least one signal indicative of each of the level of a liquid within a vessel and the turbidity of said liquid within said vessel.

9. A multi-function sensor comprising:
a substrate having a first axis;
a first electric circuit comprising a first thermocouple junction and a second thermocouple junction disposed on said substrate, said second thermocouple junction located in a spaced relationship from said first thermocouple junction along said first axis;
a second electric circuit comprising a heat source disposed on said substrate for raising the temperature of said first thermocouple junction above an ambient temperature;
a light source located at one end of said substrate; and
a photosensor paired with said light source; and wherein said sensor is adapted to generate at least one signal indicative of each of the level of a liquid within a vessel and the turbidity of said liquid within said vessel.

10. A multi-function sensor comprising:
a fluid flow rate sensor module;
a turbidity sensor module;
a temperature sensor module; and
a pressure sensor module;
wherein the temperature sensor module comprises a thermocouple junction and the pressure sensor module comprises a thermocouple junction.

11. The multi-function sensor of claim 10, wherein at least the fluid flow rate sensor module is encapsulated by a thermally-conductive polymer.

12. A multi-function sensor comprising:
a fluid flow rate sensor module; and
a turbidity sensor module;
wherein the fluid flow rate sensor module comprises a detection circuit and a heating circuit, the detection circuit comprising a plurality of thermistors and a plurality of resistors, the detection circuit adapted to provide a differential voltage that varies in response to a change in temperature of the thermistors and the heating circuit comprising at least one resistor in thermal communication with at least one thermistor.

13. The multi-function sensor of claim 12 further comprising a ceramic substrate and wherein the detection circuit and the heating circuit are deposited on the ceramic substrate.

14. The multi-function sensor of claim 13 wherein the detection circuit comprises a ceramic-filled carbon paste that is screen printed onto the ceramic substrate to form the plurality of thermistors.

15. The multi-function sensor of claim 12 further comprising a body comprising a tubular member having a longitudinal axis and a passageway extending therethrough in the direction of the longitudinal axis.

16. The multi-function sensor of claim 15, wherein the body further comprises a housing disposed within the passageway, and wherein the fluid flow rate sensor module is received within the housing such that at least a portion of the fluid flow rate sensor module lies within the passageway.

17. The multi-function sensor of claim 16, wherein at least one thermistor of the detection circuit lies within the passageway.

18. The multi-function sensor of claim 15, wherein the body comprises a thermally-conductive polymer.

19. The multi-function sensor of claim 12 wherein the turbidity sensor module comprises a reflective-mode-type optical sensor comprising:
a light source; and
a photosensor; and wherein
said photosensor measures an amount of reflected light from said light source.

20. The multi-function sensor of claim 12 wherein the turbidity sensor module comprises a transmissive-mode-type optical sensor comprising:
a light source; and
a photosensor paired with said light source; and wherein
said photosensor measures an amount of transmitted light from said light source.

21. The multi-function sensor of claim 12, further comprising an electrical insulating rigid substrate.

22. The multi-function sensor of claim 21, wherein said fluid flow rate sensor module and said turbidity sensor module are located on said substrate, and further comprising an electrically insulating coating covering at least said fluid flow rate sensor module.

* * * * *